F. E. REED.
AUTOMOBILE CONTROL LEVER.
APPLICATION FILED AUG. 1, 1919.
1,319,418.
Patented Oct. 21, 1919.
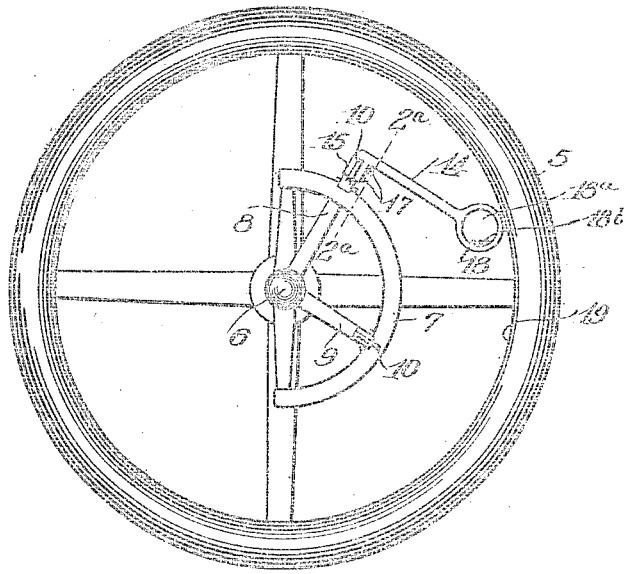
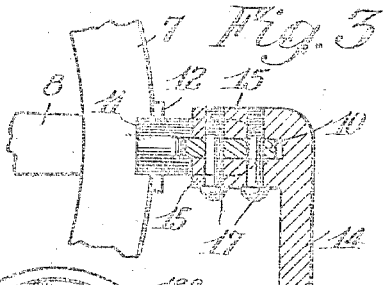
WITNESSES:
INVENTOR
Frank E. Reed
BY
HIS ATTORNEY

UNITED STATES PATENT OFFICE.

FRANK E. REED, OF ROCHESTER, NEW YORK.

AUTOMOBILE CONTROL-LEVER.

1,319,418.

Specification of Letters Patent.

Patented Oct. 21, 1919.

Application filed August 1, 1919. Serial No. 314,707.

*To all whom it may concern:*

Be it known that I, FRANK E. REED, of Rochester, in the county of Monroe and State of New York, have invented certain new and useful Improvements in Automobile Control-Levers; and I do hereby declare the following to be a full, clear, and exact description of the same, reference being had to the accompanying drawings, forming a part of this specification, and to the reference-numerals marked thereon.

This invention relates to motor vehicle construction and, more particularly, to controlling and steering mechanism for automobiles, one object of the invention being the provision of a simple and effective extension attachment for the control levers so that they may be operated by the driver's hand without removing the latter from the steering wheel.

Another object is to provide a device of the above character which is readily attached to the levers, and formed with a convenient handle movable close to the inner circumference of the steering wheel for operation by the driver with the thumb of a hand engaged in operation of the wheel. To these and other ends the invention consists in certain improvements and combinations of parts, all as will be hereinafter more fully described, the novel features being pointed out in the claims at the end of the specification.

In the drawings:

Figure 1 is a top plan view of the controlling and steering apparatus of an automobile with the invention applied thereto.

Fig. 2 is a section on the line 2ª—2ª of Fig. 1.

Fig. 3 is a section on the line 3ª—3ª of Fig. 2, and

Fig. 4 is a perspective view of the extension attachment.

Similar reference characters throughout the several views indicate the same parts.

This invention comprises an extension attachment for the usual throttle and spark control levers of an automobile for the purpose of bringing them conveniently under the control of the driver's hand while the latter operates the steering wheel, the arrangement being such that the levers may be quickly located and operated by shifting the hand along the rim of the wheel without taking the eyes from the road or removing the hand from the wheel. The embodiment of the invention at present preferred is applied in conjunction with a steering wheel 5 of the usual type carried on a steering post 6, on which is also mounted a control lever sector 7, and control levers 8 and 9 constituting the means for controlling the throttling of the charge and timing of the spark respectively. These levers are shown as terminating adjacent the sector 7, as is usual, and are provided at their ends with finger pieces 10, having also lugs 11 embracing the sector 7 for supporting and guiding the levers. The latter carry also detent or friction devices 12 actuated by springs 13 into engagement with the sector for producing the friction desired for maintaining the levers in adjusted position.

The extension attachment at present shown as applied to the lever 8, although applicable, of course, to both levers if desired, comprises an arm 14 suitably formed at one end for attachment to the lever, having preferably angular lugs 15 provided with openings 16 arranged to register with similar openings, formed in the finger piece 10 of the lever, for receiving bolts or screws 17 for securely attaching the arm to the levers.

The extension arm is formed at its other end with a suitable handle or finger piece, preferably in the shape of a socket or thimble 18 having a closed end 18ª formed with perforations 18ᵇ permitting the escape of any accumulated moisture. The fingerpiece is adapted for convenient engagement by a thumb or finger and the latter is protected from injury by contact with the spokes of the steering wheel by the closed bottom or end 18ª. The length of the arm and angularity of the lugs 15 is so proportioned as to bring the piece 18 into close proximity to the inner circumference of the steering wheel, and as the latter and the levers are concentrically mounted, the fingerpiece occupies this position of proximity to the wheel in all positions of adjustment of the lever.

The construction thus enables the driver, while operating the steering wheel, and without removing the hands therefrom, to conveniently engage and operate the control levers by a thumb or finger and the location of the finger piece of the extension arm in proximity to the steering wheel also enables the control lever to be quickly located by the hand without taking the eyes from the road to search for it.

The extension arm is inexpensive to manufacture and capable of general application to the controlling and steering variety of mechanisms of motor vehicles for accomplishing the objects described.

I claim as my invention:

1. In a controlling and steering mechanism for motor vehicles, the combination with a steering wheel and a controlling lever rotating substantially about the center of said wheel, of an angular arm adapted for attachment to said lever and having an operating finger socket movable in proximity to the inner circumference of the rim of the wheel.

2. In a controlling and steering mechanism for motor vehicles, the combination with a steering wheel, a control lever sector, and a control lever terminating adjacent the sector, said sector and lever being substantially concentric with said wheel, of an arm having an angular portion at one end adapted for attachment to said lever and having at its other end an operating finger piece movable in proximity to the inner circumference of the rim of the wheel.

3. In a controlling and steering mechanism for motor vehicles, the combination with a steering wheel and a controlling lever rotating substantially about the center of said wheel, of an arm adapted to be attached to the lever and to extend at an angle with the latter, and having at its end a socket movable adjacent the inner circumference of the rim of said wheel for actuation by the driver with the thumb of the hand operating the wheel.

FRANK E. REED.